Feb. 28, 1961 D. A. SILLERS, JR 2,973,056
GAS CLEANING APPARATUS
Filed July 6, 1956 2 Sheets-Sheet 1

INVENTOR
Donald A. Sillers, Jr.
his attorneys

Feb. 28, 1961 D. A. SILLERS, JR 2,973,056
GAS CLEANING APPARATUS
Filed July 6, 1956 2 Sheets-Sheet 2

INVENTOR
Donald A. Sillers, Jr.

United States Patent Office 2,973,056
Patented Feb. 28, 1961

2,973,056

GAS CLEANING APPARATUS

Donald A. Sillers, Jr., % Peerless Manufacturing Co., P.O. Box 13165, Dallas, Tex.

Filed July 6, 1956, Ser. No. 596,316

10 Claims. (Cl. 183—10)

This invention relates to means for mechanically cleaning entrained particles from a gas.

In the process of distributing fuel and other gases, they are ordinarily sent through pipe lines. Gas flowing through the pipe lines can be expected to pick up and carry with it impurities of various kinds. Solid particles may be entrained in the gas either because of corrosion of the pipe line or because of dirt left in the line at the time of construction. Liquid particles, usually oil, are frequently encountered which come into the line at compressor stations or result from condensation from the gas going through the line. Before using the gas, it is desired that it be cleaned to remove both solid and liquid particles which have been entrained in the gas.

I provide a casing, gas inlet means discharging into the casing, gas filter means positioned in the casing, and gas outlet means on the opposite side of the filter means from the inlet means. I prefer to form a generally spherical casing and advantageously position the filter means within the casing at an angle to the vertical. The gas inlet means discharge into the casing on one side of the filter means and the gas outlet means are placed on the opposite side of the casing. Preferably, the filter means comprise a thin flat filter medium which extends to the inner walls of the casing. I prefer to form a portion of the casing into a sump to receive entrained particles which are separated from the gas. Preferably the inlet means direct the gas toward the sump.

In the preferred embodiment of my invention I mount the filter means rotatably and provide means to rotate the filter means. I further provide a baffle which screens part of the filter means from direct contact with the inlet portion of the casing. Adjacent the gas outlet means, I provide means for removing mist from the outgoing gas. I further provide means to regulate the level of a liquid in the sump and means for circulating the liquid in the sump.

For a given gas flow the filter must be of adequate size to remove entrained particles. As the flow increases, the size of the filter must likewise be increased. The spherical casing permits a filter of given size to be employed with a minimum amount of steel in the casing.

Other details, objects and advantages of my invention will become apparent from the following detailed description of a present preferred embodiment of my invention.

In the accompanying drawings, I have illustrated a present preferred embodiment of my invention in which Figure 1 is a side elevation of a gas scrubber embodying my invention also showing certain associated apparatus;

Figure 3:
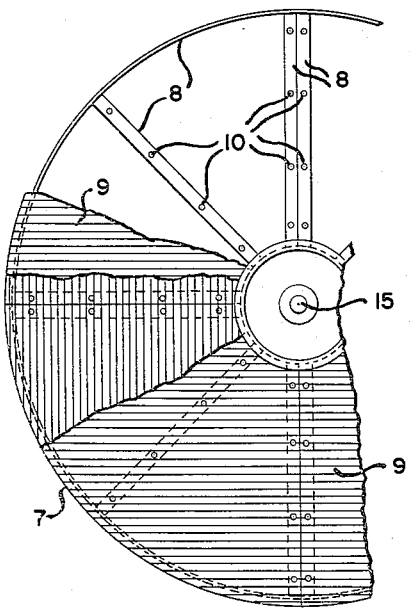
Figure 3 is a view of a portion of the filter means with certain portions removed.
Figure 4:
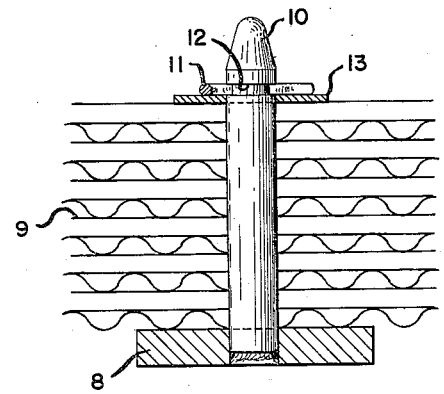
Figure 4 is a partial cross-sectional view of the filter medium showing associated attaching means.

The scrubber comprises a generally spherical casing 1 mounted upon foundations 2. An inlet pipe 3 and an outlet pipe 4 are attached to the casing 1. A sump 5 is fastened to the lower side of casing 1 and constitutes an extending portion of the casing. It may be removed to give access to the inside of the sphere through manhole 21. Inlet pipe 3 is directed downwardly into casing 1 and causes incoming gas to flow in the general direction of sump 5. A baffle 6 at the extremity of inlet pipe 3 further aids in directing the gas downwardly. A filter 7 is mounted generally on a diameter of the sphere at an angle to the vertical. It comprises a circular frame 8 (Figure 3) on which a filter medium 9 is mounted. It will be noted that the position of inlet pipe 3 and baffle 6 prevents direct flow of the incoming gas to filter 7. Conveniently, the filter medium 9 comprises a plurality of layers of ordinary window screen which have been corrugated and placed with the corrugations running at right angles to one another in successive layers. A plurality of pins 10 are mounted on frame 8 and the screens are impaled thereon. A spring clip 11 is fitted in a recess 12 on the head of each pin and holds a washer 13 which in turn serves to hold the screens in position on frame 8. A flange 14 is positioned around the inner circumference of the casing in position to mask the edge of the filter and prevent it from being by-passed by the gas flow. Frame 8 is mounted on the end of a shaft 15 journaled in bearing 16. It is driven from a small gear motor 17 through a gland 18. A baffle 19 generally masks the lower portion of the filter from direct contact with sump 5 and also supports bearing 16. It extends across the sphere from wall to wall up to the height of bearing 16. A notch 20 is cut in the lower portion of baffle 19 adjacent manhole 21.

Figure 5:
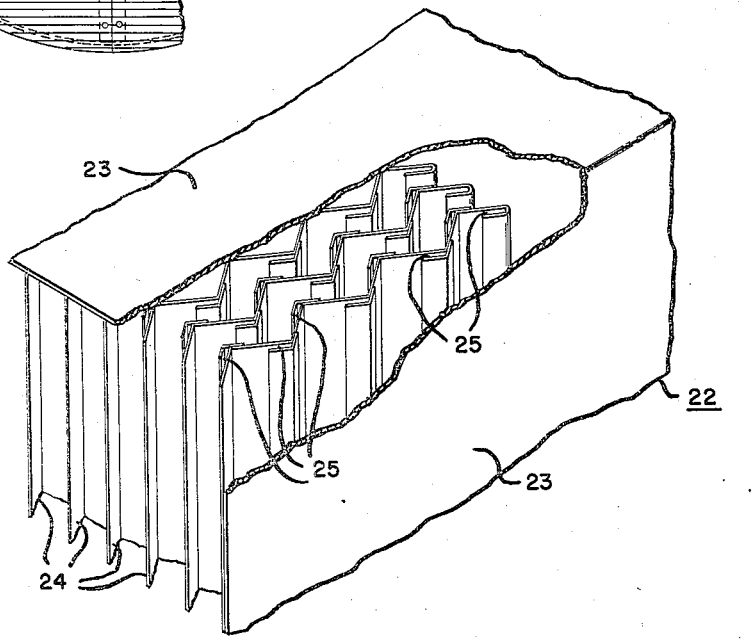
Figure 5 is a partial perspective view of the mist-removing means.

A mist extractor 22 is positioned adjacent outlet pipe 4. Partitions 23 support mist extractor 22 and prevent gas from flowing through the outlet except by passing through mist extractor 22. The mist extractor (Figure 5) comprises a plurality of closely spaced baffles 24 which define tortuous paths through the mist extractor. Pockets 25 are provided at the outside corners of the baffles.

A gauge glass 26 is mounted on the casing as well as a level control 27 and a power operated valve 28. An outlet pipe 29 having a valve 30 leads from the bottom of sump 5 to a settling tank 31. A centrifugal pump 32 has an intake 33 in settling tank 31 and discharges into storage tank 34 through a pipe 35 and valve 36. Storage tank 34 is connected to the interior of casing 1 by pipe 37 and equalizing pipe 38 which are equipped with valves 39 and 40 respectively. A valve 41 is connected to pipe 38 and may be opened to the atmosphere.

Figure 1:
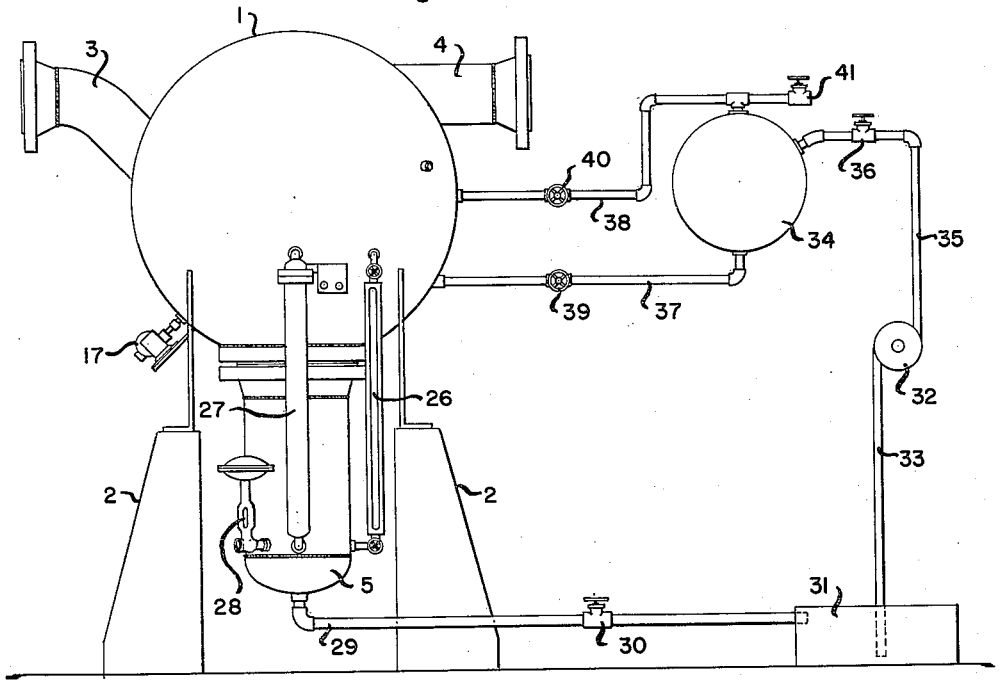
Figure 2:
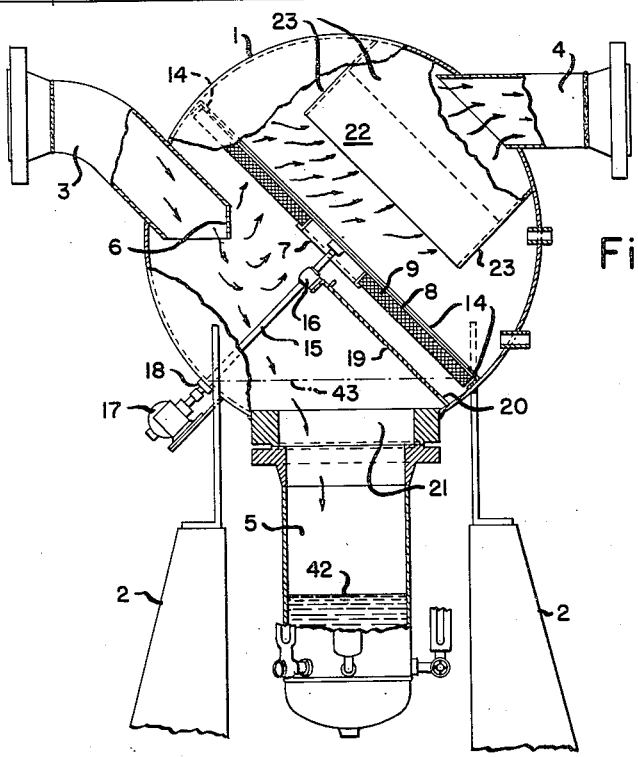
Figure 2 is a side elevational view of the scrubber shown in Figure 1 partially in section.

The scrubber is made ready for operation by closing valves 30, 39 and 40, by opening valves 36 and 41, and by pumping storage tank 34 full of oil. Valves 41 and 36 are then closed and valves 39 and 40 opened until the scrubber is filled with oil to the desired level. When the gas entering through inlet pipe 3 contains only liquid particles such as oil, the oil level is initially set at 42, as shown in Figure 2. When solid particles are delivered with the incoming stream of gas, some higher level, such as 43, will ordinarily be maintained. Gear motor 17 is started causing filter 7 to rotate slowly.

If the gas flowing through the scrubber contains only liquid particles, the sump is initially filled to level 42 and level control 27 is set to maintain that level. The incoming gas is thrown downwardly into the sump and then must make a sharp turn rising above the level of bearing 16 and baffle 19 to pass through filter medium 9. Heavy particles of liquid will be thrown out by the sharp change of direction and will drop out of the flowing stream into the sump. As the gas passes through filter medium 9, it will be broken up by the screen wire into a number of fine screens and further particles of liquid which were not heavy enough to be thrown out into the sump will collect on the screen wire and agglomerate there. The gas then passes through mist extractor 22 to remove fine liquid particles carried in the gas as a mist. Baffles 24 cause the gas to pass through the mist extractor in a series of narrow ribbons which are thrown against succeeding walls of the baffles. Liquid in the gas in the form of mist is likewise thrown against the baffles to which it adheres, and it is then carried into pockets 25 which trap it. As liquid accumulates in the pockets, it will flow to the bottom and then out of the mist extractor into the lower portion of the sphere. As filter 7 slowly revolves, a portion of it will be behind baffle 19 and out of the gas flow. The liquid which has been collected on the screens will then tend to flow downwardly because of gravity and the fact that there is no upward flow through that portion of the filter. The collected liquid will drip off onto the upper side of baffle 19 and run through notch 20, falling iinto sump 5.

As liquid builds up in sump 5, level control 27 will operate valve 28 to allow liquid to flow from the sump as it is added maintaining a substantially constant level.

If solid particles are entrained in incoming gas, the liquid level in the casing is raised, for example, to 43. Again heavy particles of solids as well as any heavy liquid particles will be thrown into sump 5 by the sudden change of direction of the incoming gas. Smaller particles of solids and liquid will be carried to filter 7 and will be trapped upon the screen wire. The cleaned gas then flows through mist extractor 22 to outlet pipe 4. As filter 7 revolves, it will be observed that the outer periphery will be immersed in the oil at its lowest point. As the filter further revolves, oil on the periphery will flow back toward the center and will tend to wash dirt off the screen and into the sump. Further washing of the filter may be obtained by raising the oil level in the casing. The oil serves the further purpose of wetting the screen if there is not sufficient moisture in the gas for this purpose causing the solid particles to adhere more readily. Because of the fact that the filter is at an angle to the vertical, the washing action will generally tend to carry solid particles and liquid back to the face of the filter rather than draining down parallel to the face. This results in a more efficient removal of impurities from the filter. The washing of the filter may be further controlled by adjustment of the oil level in the casing.

When solids are being separated from the gas stream, there will tend to be an accumulation of dirt in sump 5. In these circumstances, valve 30 is opened and the scrubber is drained into settling tank 31. Valve 30 is then closed and a fresh charge of oil is drained into storage tank 34 as when the scrubber is first brought into operation. After solids in the oil have settled out in tank 31, the oil may be pumped to storage tank 34 for reuse in the scrubber. Alternatively, the scrubber may be taken off stream and drained by opening valves 30, 40 and 41, after which it may be refilled as previously described.

While I have described and illustrated a present preferred embodiment of my invention, it is to be distinctively understood that I do not so limit myself and that my invention may be otherwise variously practiced within the scope of the following claims.

I claim:

1. A gas scrubber comprising a generally spherical casing having a portion adapted to receive impurities entrained in an incoming gas stream, rotatably mounted gas filter means comprising a thin flat filter medium within the casing, inclined at an angle to the vertical, and forming an inlet chamber generally below the filter means and an outlet chamber generally above the filter means, the filter means blocking free passage of gas from one chamber to the other, gas inlet means discharging into the chamber beneath the filter means toward the impurity-receiving portion of the casing, gas outlet means from the chamber generally above the filter means, with the gas outlet means, and means to rotate the filter means through a washing liquid whereby the washing liquid is passed over the filter means and washes particles from the filter means in a direction generally opposite to flow gas therethrough.

2. A gas scrubber comprising a generally spherical casing having a portion adapted to receive impurities entrained in an incoming gas stream, rotatably mounted gas filter means comprising a thin flat filter medium within the casing inclined at an angle to the vertical and forming an inlet chamber generally below the filter means and an outlet chamber generally above the filter means, the filter means blocking free passage of gas from one chamber to the other, gas inlet means connecting into the chamber beneath the filter means and directed at the impurity-receiving portion of the casing, gas outlet means from the chamber generally above the filter means, mist-removing means in series flow relationship with the gas outlet means, means to rotate the filter means through a washing liquid whereby the washing liquid is passed over the filter means and washes particles from the filter means in a direction generally opposite to flow of gas therethrough, and baffle means masking the lower portion of the filter means on the inlet chamber side.

3. A gas scrubber comprising a generally spherical casing, a gas filter means comprising a flat thin filter medium arranged at an angle to the vertical, blocking free passage of gas from one portion of the casing to another portion of the casing, and forming a gas inlet chamber generally below the filter means and a gas outlet chamber generally above the filter means, gas inlet means discharging into the inlet portion of the casing, baffle means protecting the lower portion of the filter means from direct gas flow, means to wash particles from the filter means to the gas inlet chamber, gas outlet means on the opposite side of the filter means from the inlet means, means for circulating a fluid in the casing, and means to control the level of said fluid.

4. A gas scrubber comprising a casing, gas filter means within the casing at an angle to the vertical, extending between the walls of the casing in planar relationship thereto, and dividing the casing into two chambers, gas inlet means discharging into the chamber beneath the lower side of the filter means, means to rotate the periphery of said filter means through a liquid bath to continuously wash said filter means, means protecting the periphery from gas flow when it is in the liquid, gas outlet means from the chamber generally above the filter means, and gas sealing means comprising a surface placed adjacent the periphery of the filter means on the outlet chamber side thereof.

5. A gas scrubber comprising a casing, flat gas filter means rotatably placed within the casing at an angle to the vertical and extending between the walls of the casing, forming an inlet chamber adjacent the lower side of the filter means and an outlet chamber adjacent the upper side of the filter means, and blocking free passage of gas from one chamber to the other, gas inlet means discharging into the casing in the inlet chamber, means to rotate the periphery of the filter means through a liquid bath thereby continuously washing particles from the filter means to the inlet chamber, gas sealing flange means mounted on the inner wall of the casing adjacent the periphery of the filter means, gas outlet means in communication with the outlet chamber, and mist-removing means in series connection with the gas outlet means.

6. A scrubber for the removal of solid and liquid particles from a flowing stream of gas comprising a casing, flat filter means placed within the casing in planar relationship thereto, extending between the interior walls of the casing, and forming a chamber adjacent the lower side of the filter means and a chamber adjacent the upper side of the filter means, a liquid retaining sump connecting to the chamber adjacent the lower side of the filter, a gas inlet discharging into the chamber adjacent the lower side of the filter, means to rotate the filter means through the liquid in the sump thereby washing particles adhering to the filter from the filter to the chamber below the filter and into the sump, baffle means protecting the filter means from direct gas flow from the sump whereby splashing of liquid from the sump onto said filter means is prevented and gas outlet means from the chamber adjacent the upper side of the filter means.

7. A scrubber for the removal of solid and liquid particles from a flowing stream of gas comprising a casing, flat filter means placed within the casing at an angle to the vertical, extending between the interior walls of the casing, and forming a chamber generally below the filter means and a chamber generally above the filter means, gas inlet means discharging into the chamber generally below the filter means, gas outlet means from the chamber generally above the filter means, means to continuously revolve the periphery of the filter means through the liquid in the lower portion of the casing whereby said liquid is carried upwardly by rotation of the filter means and washes particles from the filter means into the chamber therebelow, and gas seal means extending between the inner wall of the casing and the filter means on the outlet side thereof.

8. A scrubber for the removal of solid and liquid particles from a flowing stream of gas comprising a generally spherical casing having a liquid retained in the lower portion thereof, filter means having two substantially parallel planar surfaces extending between the interior walls of the casing and placed at an angle to the vertical thereby defining a gas inlet chamber generally below the filter means and a gas outlet chamber generally above the filter means, gas inlet means discharging into the inlet chamber, gas outlet means from the outlet chamber, means to revolve the periphery of the filter through the liquid to continuously wash particles from the filter means in a direction opposite to the flow of gas through the filter means, baffle means interposed between the filter means and the body of the liquid thereby preventing splashing of the liquid on the filter means, and liquid particle separator means in series flow relationship with the outlet means.

9. A gas scrubber comprising a generally spherical casing, gas filter means rotatably mounted within the casing, inclined at an angle to the vertical, and extending between the walls of the casing thereby defining a chamber generally beneath the filter means and a chamber generally above the filter means, gas inlet means discharging into the chamber beneath the filter means, gas outlet means from the chamber above the filter means, and filter rotating means connected to said filter to continuously clean the filter means by rotating the periphery of the filter through a liquid, liquid clinging to the periphery of the filter means after immersion being carried around by rotation of the filter means and draining through the filter means by gravity to the chamber beneath the filter means in a direction generally opposite to the flow of gas through the filter.

10. A gas scrubber for the removal of particles from a flowing gas stream comprising a generally spherical casing having a liquid in the lower portion thereof, filter means rotatably mounted in the casing with the periphery in the liquid and dividing the casing into an inlet chamber and an outlet chamber, gas inlet means to one side of the casing discharging into the inlet chamber, filter rotation means in operative connection with the filter means to rotate the periphery of the filter means through the liquid, flange means positioned on the inside of the casing and extending behind the filter means on the outlet side thereof in rubbing relationship around the periphery of the filter means, whereby gas flow through the scrubber urges the filter means against the flange means and gas is prevented from bypassing the filter means, and gas outlet means from the outlet chamber.

References Cited in the file of this patent
UNITED STATES PATENTS

| | | |
|---|---|---|
| 302,163 | Saladin | July 15, 1884 |
| 1,302,281 | Bates | Apr. 29, 1919 |
| 1,471,705 | Porter | Oct. 23, 1923 |
| 1,578,611 | Sanborn | Mar. 30, 1926 |
| 1,860,697 | Traviss | May 31, 1932 |
| 2,015,174 | Anglemeyer | Sept. 24, 1935 |
| 2,024,122 | Wemhoener | Dec. 10, 1935 |
| 2,453,447 | McKeown | Nov. 9, 1948 |
| 2,485,767 | Patterson | Oct. 25, 1949 |
| 2,489,903 | Kraft et al. | Nov. 29, 1949 |
| 2,527,392 | Bradshaw | Oct. 24, 1950 |
| 2,703,228 | Fleisher | Mar. 1, 1955 |
| 2,796,145 | King | June 18, 1957 |

FOREIGN PATENTS

| | | |
|---|---|---|
| 27,280 | Great Britain | May 28, 1914 |